US010298995B1

(12) United States Patent
Stumbo

(10) Patent No.: US 10,298,995 B1
(45) Date of Patent: May 21, 2019

(54) PREDICTIVE PRE-BUFFERING

(71) Applicant: DISH Network L.L.C., Englewood, CO (US)

(72) Inventor: Joshua Stumbo, Spokane, WA (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 15/859,153

(22) Filed: Dec. 29, 2017

(51) Int. Cl.
| | |
|---|---|
| H04N 21/231 | (2011.01) |
| H04N 21/24 | (2011.01) |
| H04N 21/25 | (2011.01) |
| H04N 21/258 | (2011.01) |
| H04N 21/433 | (2011.01) |
| H04N 21/84 | (2011.01) |
| H04N 21/44 | (2011.01) |

(52) U.S. Cl.
CPC ......... *H04N 21/433* (2013.01); *H04N 21/251* (2013.01); *H04N 21/25891* (2013.01); *H04N 21/44004* (2013.01); *H04N 21/84* (2013.01)

(58) Field of Classification Search
CPC ....... H04N 21/23106; H04N 21/23109; H04N 21/2402; H04N 21/251; H04N 21/252; H04N 21/25808; H04N 21/25891; H04N 21/262

USPC .................. 725/115, 134, 145, 151
See application file for complete search history.

(56) References Cited

U.S. PATENT DOCUMENTS

| | | | | |
|---|---|---|---|---|
| 2014/0344861 | A1* | 11/2014 | Berner | H04N 21/4826 725/46 |
| 2015/0208120 | A1* | 7/2015 | Yao | H04N 21/25833 725/9 |

* cited by examiner

*Primary Examiner* — Dominic D Saltarelli
(74) *Attorney, Agent, or Firm* — Kilpatrick Townsend & Stockton LLP

(57) ABSTRACT

Described herein are systems and methods for predictive pre-buffering of content for a user. Embodiments include a prediction system that can receive trending information from social media sources and other streaming video sources. The prediction system can also receive user viewing history to identify the programs the user has viewed, the genres of the programs the user has viewed, and amount of programming the user consumes. Based on the user's viewing history, the prediction system can identify preferred genres for the user and other preferred content information. Based on the trending programs and the user's preferred genres, the prediction system can predict which of the trending programs that the user may watch. Based on the prediction, the system can pre-buffer some portion of the programs that the system predicted the user may watch in a cache of the device on which the user watches programming.

19 Claims, 5 Drawing Sheets

PREDICTIVE PRE-BUFFERING

BACKGROUND

Users of electronic devices and content prefer instant gratification over waiting for churning processors, loading data, and network bandwidth availability. When users click a link, launch an application, or click play to watch content, the user expects a near instant result. However, sometimes the instant result is not provided. Particularly when it comes to streaming content, network bandwidth availability and processing power can limit how quickly streamed content begins playing.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for predictive pre-buffering. The system can be configured to receive trending program names from social media sources and personal viewing history of a user including program names of programs previously viewed by the user. The system can identify preferred programs based on the trending program names and the personal viewing history of the user. The system can buffer a portion (e.g., 30 seconds, 2 minutes, or 5 minutes) of the preferred programs in a cache. Other embodiments of this aspect include corresponding computer systems, apparatus, and computer programs recorded on one or more computer storage devices, each configured to perform the actions of the methods.

Implementations may include one or more of the following features. Optionally, the system can identify genres and categorize each trending program name based on the genre of the program. The system can also identify a preferred genre based on the user's personal viewing history. The system can identify trending programs of the preferred genre and designate them as preferred programs.

Optionally, the system can obtain the current network load value and if the current network load value indicates available network bandwidth, the system can buffer a portion of the preferred programs in the cache. If the current network load value is high, indicating that the network is overloaded or has little available bandwidth, the system can wait and check the current network load later. Optionally, the system can obtain a device status value indicating whether the user device that has the cache for buffering is available or busy. If the device status value indicates that the device is available, the system can buffer the portion of the preferred programs in the cache. If the device status value indicates the device is busy, the system can wait and check the device status later.

Optionally, the system can calculate a combined score for each trending program based on a personal viewing history score and a popularity score of the trending program. The system can receive the popularity score of the trending program from a social media source. The system can also calculate the personal viewing history score for the trending program based on a similarity of the trending program to the user's previously viewed programs. (e.g., based on genre, description, and so forth). The system can weight to the popularity score based on past user selections of the preferred programs. The system can also weight the personal viewing history score based on the past user selections of the preferred programs. The system can combine the weighted popularity score and the weighted personal viewing history score to generate a combined score. Trending programs that have a high combined score can be designated as preferred programs. Optionally, the system can rank the preferred programs based on the combined score for each of the preferred programs. Optionally, any preferred programs with a high combined score can be provided to the user as a suggested program. Optionally, the system can determine how much of the preferred program to buffer based on the rank of the preferred program.

Optionally, the system can receive a user selection to save time and accordingly increase the amount of each preferred program to buffer and/or increase the number of preferred programs. Optionally, the system can receive a user selection to save space and accordingly decrease the amount of each preferred program to buffer and/or decrease the number of preferred programs. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When a user selects a program (e.g., streaming video on demand content) to watch, the user does not want to wait for the program to download a sufficient amount to begin playback. Rather the user would like the program to begin playing immediately. To solve that problem, described herein are systems and methods to predictively pre-buffer programs that the system determines the user is most likely going to watch. The system can predict the programs that the user is going to watch and buffer a portion (e.g., 2 minutes) of the program so that when the user selects the program to play, playback can immediately begin from the buffer, and while playing out of the buffer, the remainder of the program can begin downloading or streaming.

Embodiments include a prediction system that can receive trending information from social media sources and other streaming video sources. The prediction system can also receive user viewing history to identify the programs the user has viewed, the genres of the programs the user has viewed, and amount of programming the user consumes. Based on the user's viewing history, the prediction system can identify preferred genres for the user and other preferred content information. Based on the trending programs and the user's preferred genres, the prediction system can predict which of the trending programs that the user may watch. Based on the prediction, the system can pre-buffer some portion of the programs the user may watch in a cache of the device on which the user watches programming. Additionally, the prediction system can receive device status data that indicates the availability of the device and current network load data that indicates whether the network is busy or has available bandwidth. If the device is available and the network has available bandwidth, the system can pre-buffer a portion of the programs the system predicted that the user will watch.

Figure 1:
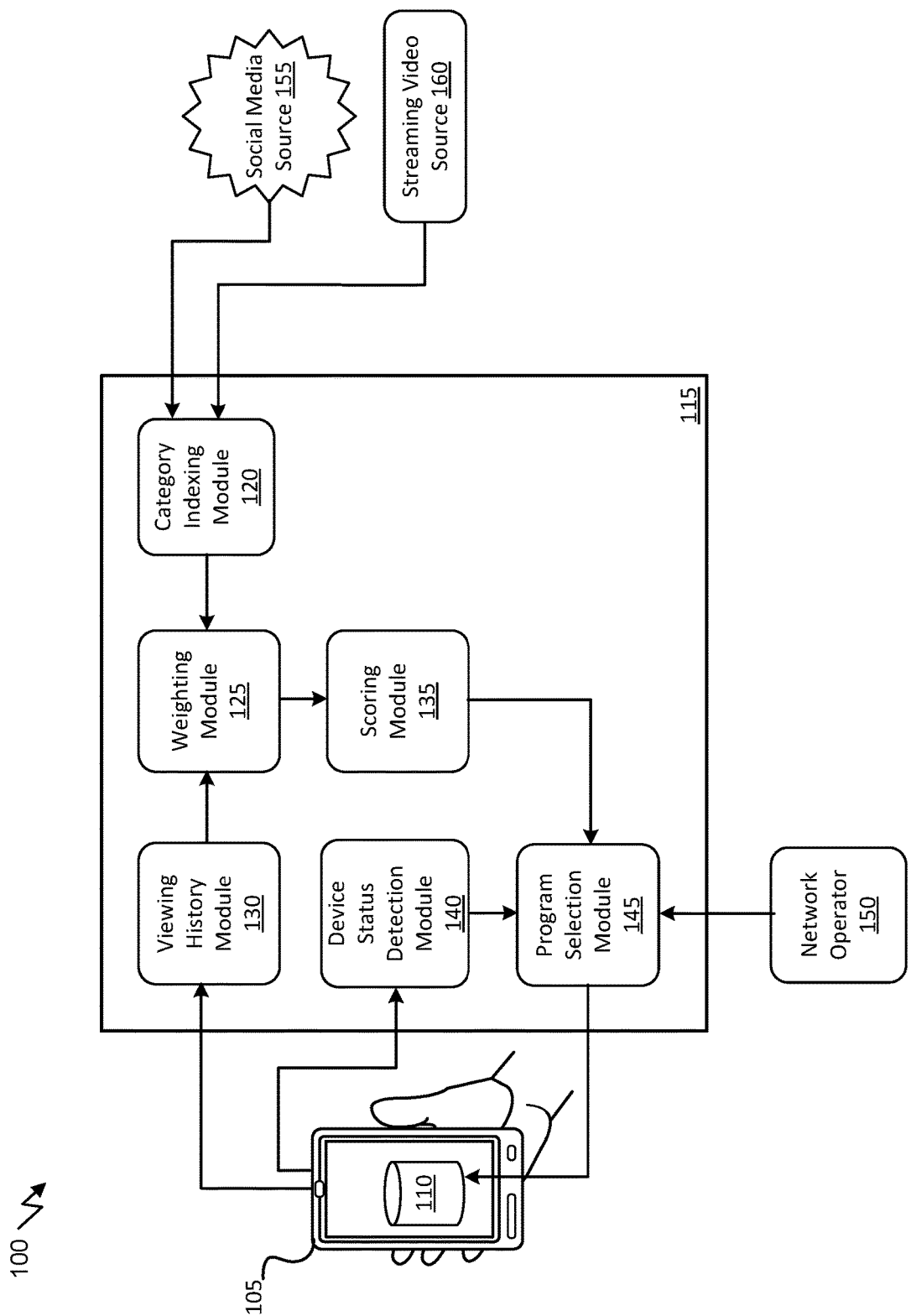
FIG. 1 illustrates a block diagram of an embodiment of a system for predictive pre-buffering.

FIG. 1 illustrates an exemplary block diagram of a predictive pre-buffering system 100. The predictive pre-buffering system 100 can include a user device 105, a pre-buffering server 115, a network operator 150, social media source 155, and streaming video source 160. Each of the components can communicate with other components via a network (not shown). The network can include any suitable network, such as the Internet.

The user device 105 can include a cache 110. The user device 105 can be any suitable device for viewing streaming content including, for example, a smartphone, a tablet, a laptop, a desktop computer, a set-top box, and so forth. The cache 110 can be a content cache used for buffering streaming content before playback and/or during playback.

The social media source 155 can be any social media source including, for example, Facebook®, Instagram®, Twitter®, and so forth. The social media source 155 can provide information on trending streaming content. As an example, the social media source 155 can identify that certain television programs or movies are trending because many users are posting about the program or movie. While only a single social media source 155 is depicted for simplicity, any number of social media sources 155 can be included in predictive pre-buffering system 100.

Streaming video source 160 can be any streaming video source including, for example, Netflix®, Amazon Prime®, YouTube®, and so forth. The streaming video source 160 can provide information on trending streaming content. As an example, the streaming video source 160 can identify content that has a high viewing rate as trending up or popular. While only a single streaming video source 160 is depicted for simplicity, any number of streaming video sources 160 can be included in predictive pre-buffering system 100.

Network operator 150 can be any network operator that can provide information regarding the network over which the content is streamed to the user device 105. The network operator 150 can provide network traffic information including, for example, whether the network is busy. The network traffic information (how busy the network is) can be provided on request or periodically to pre-buffering server 115. The network traffic information can include a network load value indicating whether the network is available and/or how busy the network is.

Figure 5:
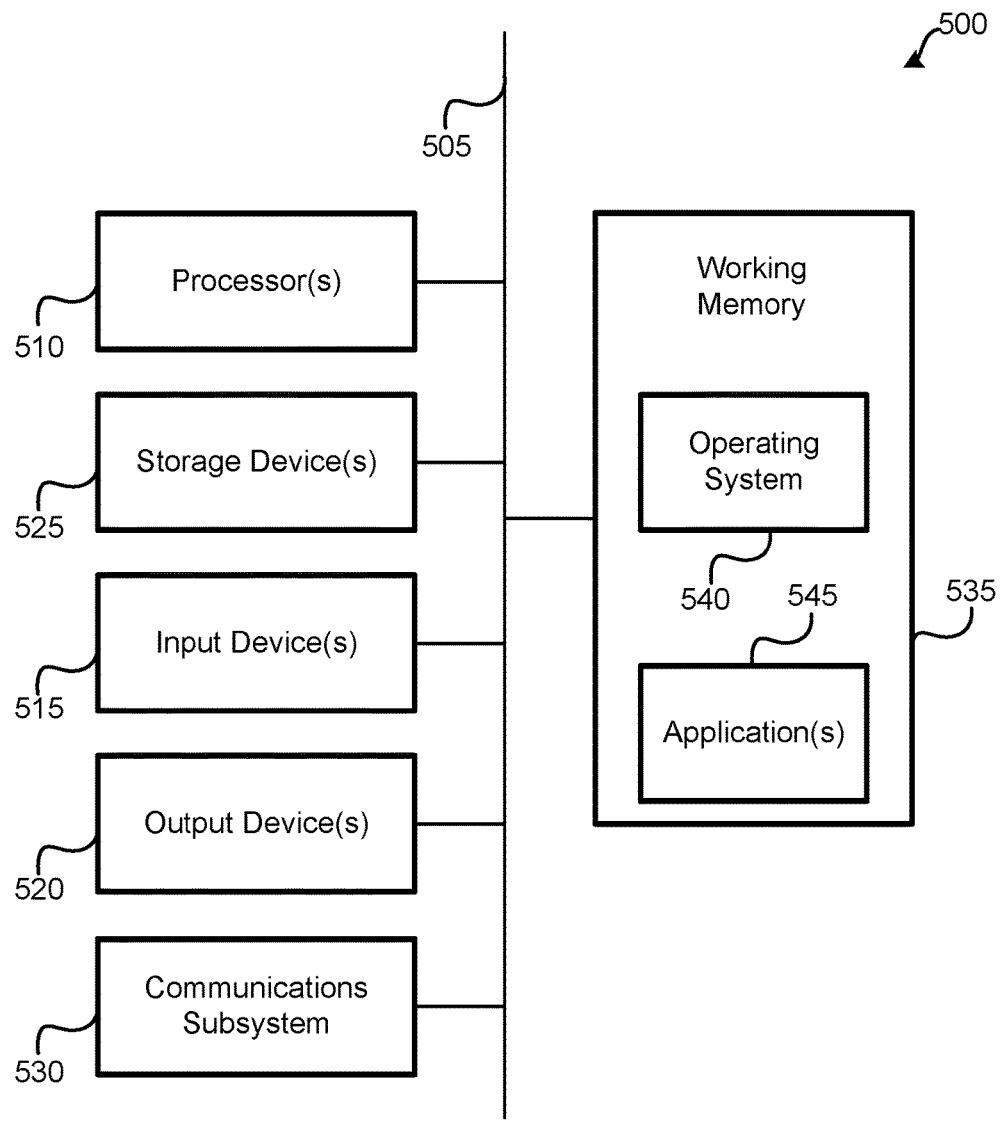
FIG. 5 illustrates an embodiment of a computer system.

Pre-buffering server 115 can be any suitable computer, including, for example, computer system 500 of FIG. 5. While only a single pre-buffering server 115 is depicted for simplicity, any number of pre-buffering servers 115 can be included in pre-buffering system 100. Further, the functionality of pre-buffering server 115 can be provided by, for example, a user's set-top box, a cloud based hosting server, a television service provider's server, or any other suitable server. The pre-buffering server 115 can include viewing history module 130, weighting module 125, category indexing module 120, device status detection module 140, scoring module 125, and program selection module 145. While specific modules are depicted, the functionality described can be performed in more or fewer modules in pre-buffering server 115 without affecting the scope of the present disclosure.

Viewing history module 130 can receive the viewing history information from user device 105. The viewing history can be the personal viewing history of the user of user device 105. The viewing history information can include a listing of program names of content the user has previously viewed. For example, the content previously viewed can have an associated program name that can be used to identify the content. Optionally, the pre-buffering server 115 can be the user's set-top box and can maintain a copy of the user's viewing history without obtaining the viewing history from the user's device 105. The viewing history module 130 can analyze the user's viewing history and determine content that the user likes. Determining content the user likes can be based on the user viewing multiple episodes of the same program or the user viewing the same content multiple times, for example. As another example, the viewing history module 130 can assign a genre to each viewed program and identify a preferred genre for the user based on the user viewing more content of any given genre. Optionally, the user can provide information indicating the user's preferences, which can also be provided to viewing history module 130 and used to identify the user's preferences. The viewing history module 130 can analyze the user's viewing history for a defined period of time. As examples, the viewing history module 130 can analyze the user's viewing history for the previous week, the previous month, the previous year, or since the user began viewing content on user device 105.

Category indexing module 120 can receive the trending information from the social media sources 155 and the streaming video sources 160. The category indexing module can categorize the trending content by, for example, assigning a genre to each trending content program. For example, each movie can be assigned a genre and each television series can be assigned a genre. Each individual television program within a television series can be assigned the television series genre and/or each individual television program within a television series can be assigned a separate genre. The category indexing module can also rank the trending content based on which content is trending upward and downward most to create a ranked list of content from most popular to least popular.

Weighting module 125 can receive the viewing history information from viewing history module 130 as well as the trending content information from the category indexing module 120. For example, the weighting module 125 can receive a ranked list of content with an associated genre for each content on the ranked list. The weight module 125 can also receive viewing history information from the viewing history module 130 including, for example, a ranked listing of the user's top ten (10) favorite programs with associated genres and/or a ranked listing of the user's preferred genres. The weighting module 125 can assign a weight to the information based on the user's history and/or preferences. For example, the weighting module 130 can assign a higher weight to the user's viewing history information because the user is most likely to continue to view content that is similar to content that the user has previously viewed. As another example, if the user has consistently viewed programs that trend on Facebook®, content that originated from Facebook® as the social media source 155 can be given a higher weight. Over time, weighting module 125 can adjust weights based on the user behaviors in viewing content based on the user's viewing history and/or the trending content. Weighting module 125 can also identify programs that are similar to programs that are trending or programs from the user's viewing history based on, for example, genre. As another example, the weighting module 125 can identify new episodes of television series' that the user has previously viewed.

Scoring module 135 can assign a score to all content that is being analyzed. The content being analyzed can include the trending content provided by social media sources 155 and streaming video sources 160. The content being analyzed can also include content the weighting module identified. Each content can be scored based on the weighting module 125 weighting information. Once each content is scored, a ranked list of content can be generated with an associated score. The score can indicate how likely the user is to want to view the content. Any suitable scoring scale can be used to indicate how likely the user is to view the content.

For example, scoring module 135 can calculate a personal viewing history score based on the user's personal viewing history for each trending content or content being analyzed. Scoring module 135 can also calculate a popularity score for each trending content based on the social media source 155 information or the streaming video source 160 information. Based on the weights from weighting module 125, the scoring module can weight each score and generate a combined score for each trending or analyzed content based on the weighted personal viewing history score and the weighted popularity score for each content item.

Device status detection module 140 can identify the user device 105 status. The user device 105 can provide status periodically or upon request. The device status can indicate, for example, the amount of available cache space in the user device 105. As another example, the device status can indicate whether the user device 105 has available processing power (e.g., if a program is running that is using the processor). As another example, the device status can indicate whether the user device 105 is currently streaming content, which can be using the processor and the cache, making one or both unavailable. The device status can be a value indicating one or more of the cache or the processor are available or not. To determine whether the device is available, the device status detection module 140 can compare the device status value with a device status threshold value to determine whether the device is sufficiently available to proceed with pre-buffering.

Program selection module 145 can receive the network status from the network operator 150, the device status from the device status detection module 140, and the content information from the scoring module 135. The program selection module 145 can determine which content to pre-buffer, how much of the content to pre-buffer, and when to pre-buffer the content. For example, the content information can include a ranked list of content, with each content having an associated score. The program selection module 145 can select the top scoring content (e.g., the top five (5) content items) to pre-buffer. The program selection module 145 can also select the amount of each content to pre-buffer (e.g., the first 30 seconds of the content, the first minute of the content, the first 5 minutes of the content, and so forth). Optionally, the program selection module 145 can select the amount of each content to pre-buffer based on the content score. For example, content with a score over a threshold value (e.g., meaning the user is highly likely to view the content) can pre-buffer a larger portion (e.g., the first three minutes of the content) than content with a score under the threshold value. As an example, the scoring system can provide scores between 0 and 10, with 10 indicating that the user is highly likely to view the content and 0 indicating that the user is unlikely to view the content. The program selection module can, for example, select content with a score of 8 or higher to pre-buffer three minutes of each content, select content with a score between 6 and 8 to pre-buffer 1 minute of each content, select content with a score between 4 and 6 to pre-buffer 30 seconds of each content, and not select content with a score below 4.

Program selection module 145 can also have access to user settings to user for determining which content to pre-buffer and how much. For example, the user may be given an option in a user interface to select whether the user would like to save time (e.g., pre-buffer more programs and/or bigger portions of the pre-buffered content) or save space (e.g., pre-buffer fewer programs and/or smaller portions of the pre-buffered content). If the user has opted to save space, the program selection module 145 can select fewer programs to pre-buffer and/or pre-buffer a smaller portion (e.g., 30 seconds instead of one minute) of the programs.

Once the selection of content and amount of content to pre-buffer is determined, program selection module 145 can identify whether the device is available based on the device status information from the device status detection module 140 and whether the network has sufficient bandwidth to support the streaming of the pre-buffer content based on the network information from the network operator 150. When the device and network are available, the program selection module 145 can pre-buffer the identified content to the cache 110 of the user device 105. Optionally, the program selection module 145 can use historical network information and device information to identify periods of time during which the network is generally available and the device is generally available. For example, during nighttime hours when users are often sleeping, the device and network may be available based on historical data, and the program selection module 145 can schedule the pre-buffering to occur during the historically available time period.

Figure 2:
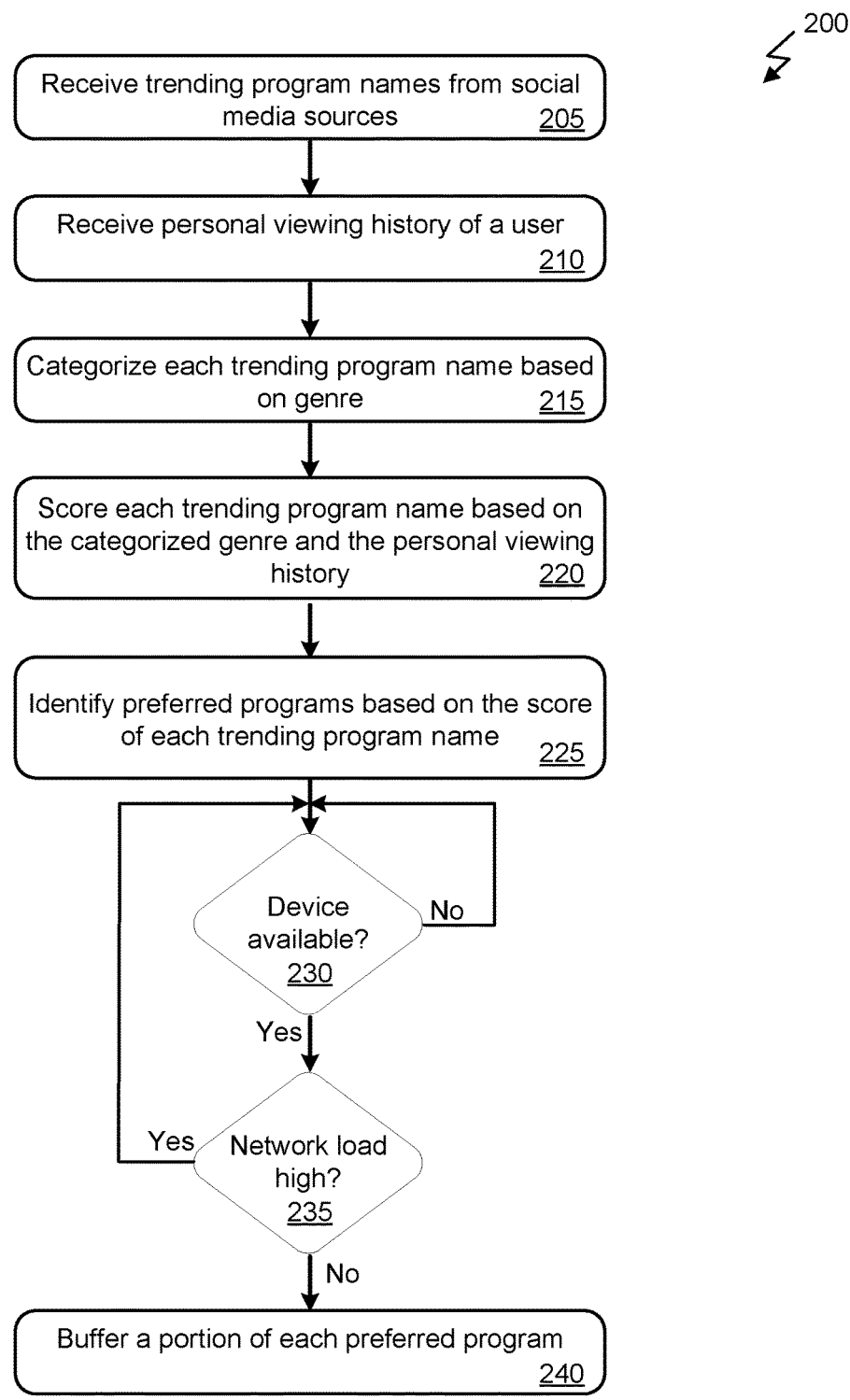
FIG. 2 illustrates an embodiment of a method for predictive pre-buffering.

FIG. 2 illustrates an exemplary method 200 for predictive pre-buffering. Method 200 can be performed by, for example, pre-buffering server 115 as described with respect to FIG. 1. Method 200 can begin at block 205 with the pre-buffering server receiving trending program names from social media sources. For example, the category indexing module 120 can receive the trending information from social media sources 155 and streaming video sources 160 as described with respect to FIG. 1.

At block 210, the pre-buffering server can receive personal viewing history of the user. The personal viewing history can include the names of movies and/or television series and specific programs the user has viewed. The personal viewing history can be for the previous day, week, month, or any other suitable time period, including the entirety of the user's viewing history. As an example, the viewing history module 130 can receive the user's personal viewing history from user device 105 as described with respect to FIG. 1.

At block 215, the pre-buffering server can categorize each trending program name based on genre. For example, the category indexing module 120 as described with respect to 120 can categorize each trending program name based on genre. The program names (i.e., content names) can be for content such as movies or television programs, which may have an associated genre. Other content, such as home videos from YouTube® may not have a specific genre, but can be categorized as home videos or designated as an "uncategorized" genre. The trending program names can each have associated information on its popularity from the social media source 155 and/or streaming video source 160. Optionally, the same program name can be trending on multiple sources, indicating it is highly popular. The trending program names can be ranked, for example, based on popularity information from the sources.

At block 220, the pre-buffering server can score each trending program name based on the categorized genre and the personal viewing history. The score can be generated by, for example, scoring module 135 as described with respect to FIG. 1. For example, the user's personal viewing history can identify "horror" as a preferred genre. The trending program names that are of the "horror" genre can be given a higher score than other trending programs of other genres. Genres can include, for example, horror, comedy, drama, romantic comedy, slap-stick comedy, suspense, thriller, documentary, and so forth. Optionally, the scoring can also include weighting as described with respect to weighting module 125 of FIG. 1. Optionally, additional content can be identified and program names associated with the additional content can be scored. For example, additional content can be identified based on the user's personal viewing history that can also be scored. Examples of additional content include new episodes of television programs that the user has previously viewed, sequels to movies that the user has previously viewed, programs known to be similar to content the user has previously viewed (e.g., the user regularly watches "Game of Thrones," so "Vikings" can be identified as a similar content), and so forth. Factors that can influence the score for a program name can include being designated as a preferred genre based on the user's viewing history, being included in the trending information from multiple social media sources 155 and/or streaming video sources 160, and weighting based on past selections (or failure to select) of the user from pre-buffered content. If, for example, the pre-buffered content includes trending programs on Instagram®, but the user never selects those programs to view, the weighting can reflect that when trending programs appear in Instagram®, they should receive a low weight. As another example, if the user regularly views programs identified as similar to programs the user has previously viewed, the identified similar programs can be given a higher weight. Based on the weight assigned to factors or program names, the scoring module can score the program names accordingly and the programs will receive scores reflective of the user's past viewing history as it develops based on pre-buffered content from the pre-buffering server.

At block 225, the pre-buffering server can identify preferred programs based on the score of each trending program name. The scores assigned by the scoring module can be used for the pre-buffering server to identify the best (most likely to be viewed by the user) programs for pre-buffering. Based on the score, the pre-buffering server can determine an amount or portion of the content to pre-buffer (e.g., the first minute of the program). For example, the program selection module 145 as described with respect to FIG. 1 can identify the preferred programs based on the score of each trending program name. Any user selections for preferences to save time or space can be used to identify a portion of each content to pre-buffer (e.g., certain size of the content file to pre-buffer or certain amount of streaming minutes of content to pre-buffer).

At block 230, the pre-buffering server can determine whether the device is available. The device status identification module 140 as described with respect to FIG. 1 can, for example, request the device status to determine whether the device is available for buffering content. As another example, the device can periodically provide device status information to the pre-buffering server. If the device is not available, the pre-buffering server can wait a predefined period of time and check whether the device is available again. If the device is available, the pre-buffering server can proceed to block 235.

At block 235, the pre-buffering server can determine whether the network has a high load or not (i.e., whether the network is available). For example, the network operator 150 as described with respect to FIG. 1 can provide network load information or a network load value that can indicate whether the network is busy or available for pre-buffering content. The network operator can provide the network load information upon request from pre-buffering server or periodically. The pre-buffering server can compare the network load information or the network load value with a network load threshold value to determine whether there is sufficient network availability (bandwidth) to support pre-buffering. If the network is not available, the pre-buffering server can wait a predefined period of time and return to block 230 to determine whether the device is still available. If the network is available, the pre-buffering server can proceed to block 240. Optionally, the pre-buffering server can schedule pre-buffering at a time that the device and network are typically available based on historical network load and device status information. At the scheduled time, the pre-buffering server can check using block 230 and 235 to determine whether the device and network actually are available at the scheduled time for performing the pre-buffering.

At block 240, the pre-buffering server can buffer a portion of each preferred program. The buffering can be in accordance with the selected program names and amount of each program name that was previously selected by, for example, program selection module 145 as described with respect to FIG. 1. The pre-buffering server can transmit the content stream for each program for the period of time identified to the user device 105 for storing in cache 110. On the user device when the user selects a program (i.e., content) for viewing that has been pre-buffered, the user device can immediately begin playback of the content from the cache while the entire program (content) can be obtained via a stream that can pick up where the pre-buffered content ends.

Figure 3:
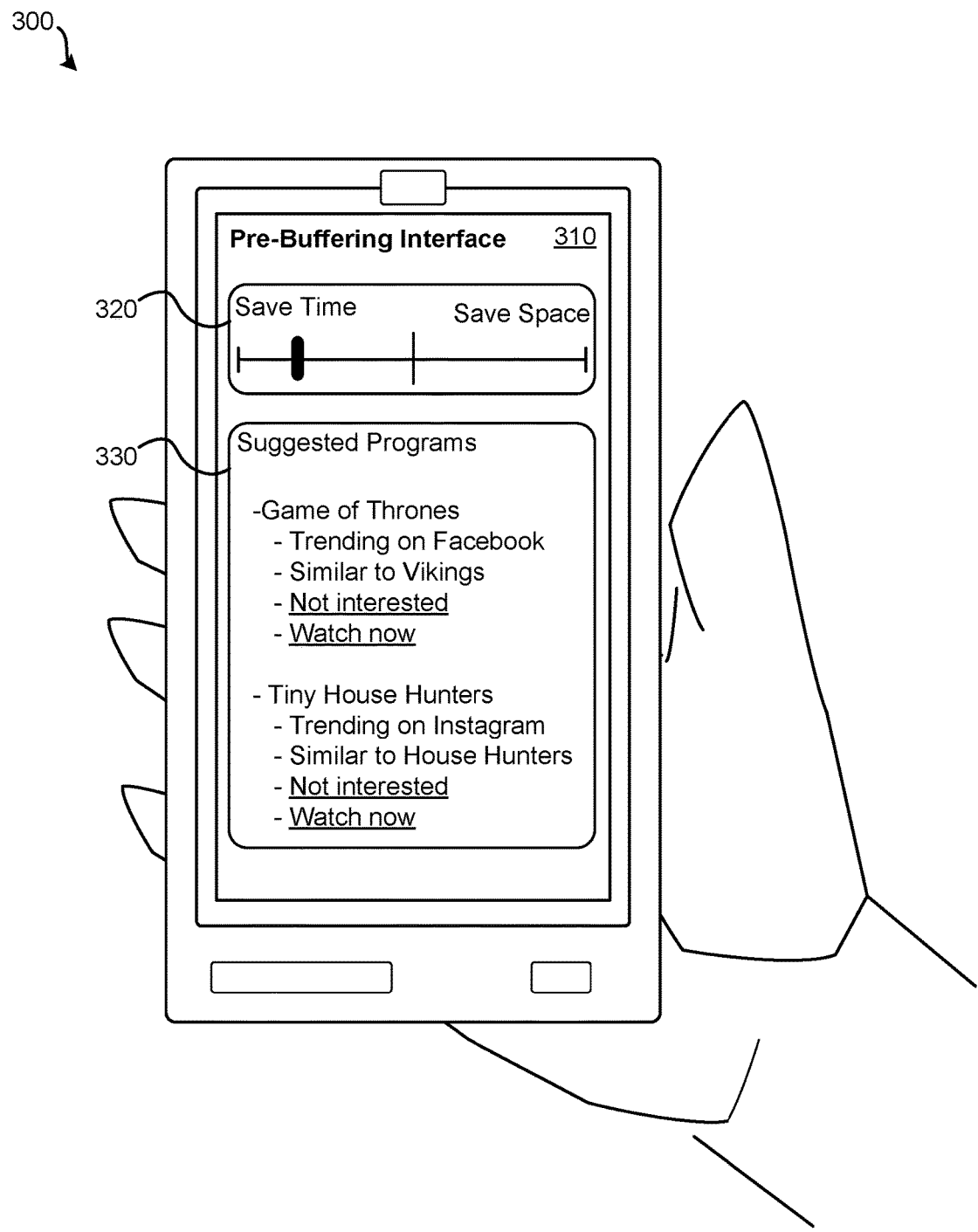
FIG. 3 illustrates an embodiment of a user interface for interfacing with a predictive pre-buffering system.

FIG. 3 illustrates an exemplary user device 300 with an exemplary user interface 310 that can be used to interact with the predictive pre-buffering system. The user device 300 can be, for example, user device 105 as described with respect to FIG. 1. The user interface 300 can provide the user with options for configuration settings as well as suggestions for viewing the pre-buffered content. For example, the configuration setting 320 can allow the user to select whether the user would like to save time (e.g., by pre-buffering more content and/or larger portions of the pre-buffered content) or to save space (e.g., by pre-buffering less content and/or smaller portions for the pre-buffered content). The configuration setting 320 can be a slider bar as shown for allowing the user to adjust the setting incrementally or, for example, a toggle switch.

User interface 310 can include a suggestion section 330 for suggesting content to the user that has been pre-buffered. For example, the suggestion section 330 can list content (e.g., "Game of Thrones") and where the content originated and/or why the content is appearing as a suggestion (e.g., "trending on Facebook®" and/or "similar to Vikings"). The suggestion section 330 can allow the user to select the content from the screen and, in response, launch the content for viewing (e.g., the "watch now" link). The suggestion section 330 can provide a way for the user to indicate that the user is not interested in watching the content (e.g., the "not interested" link). Upon selection of the "not interested" link, the pre-buffering server can receive the indication that the user is not interested in the content. The pre-buffered portion of the content can be cleared from the cache of the user device. Further, the user's viewing history can be updated to reflect that the user is not interested in that program. The indication can be used to remove the content from any future scoring or pre-buffering. The indication can also be used to adjust the weighting algorithm for future scoring and pre-buffering. Similarly, selection of the "watch now" link can cause the opposite response. The user can watch the content and an indication of the selection can be sent to the pre-buffering server. The indication can be used to adjust the weighting for future scoring and pre-buffering. Whether the indication is used to remove the content from future scoring and pre-buffering can be determined based on, for example, whether the user often watches the same content multiple times.

Figure 4:
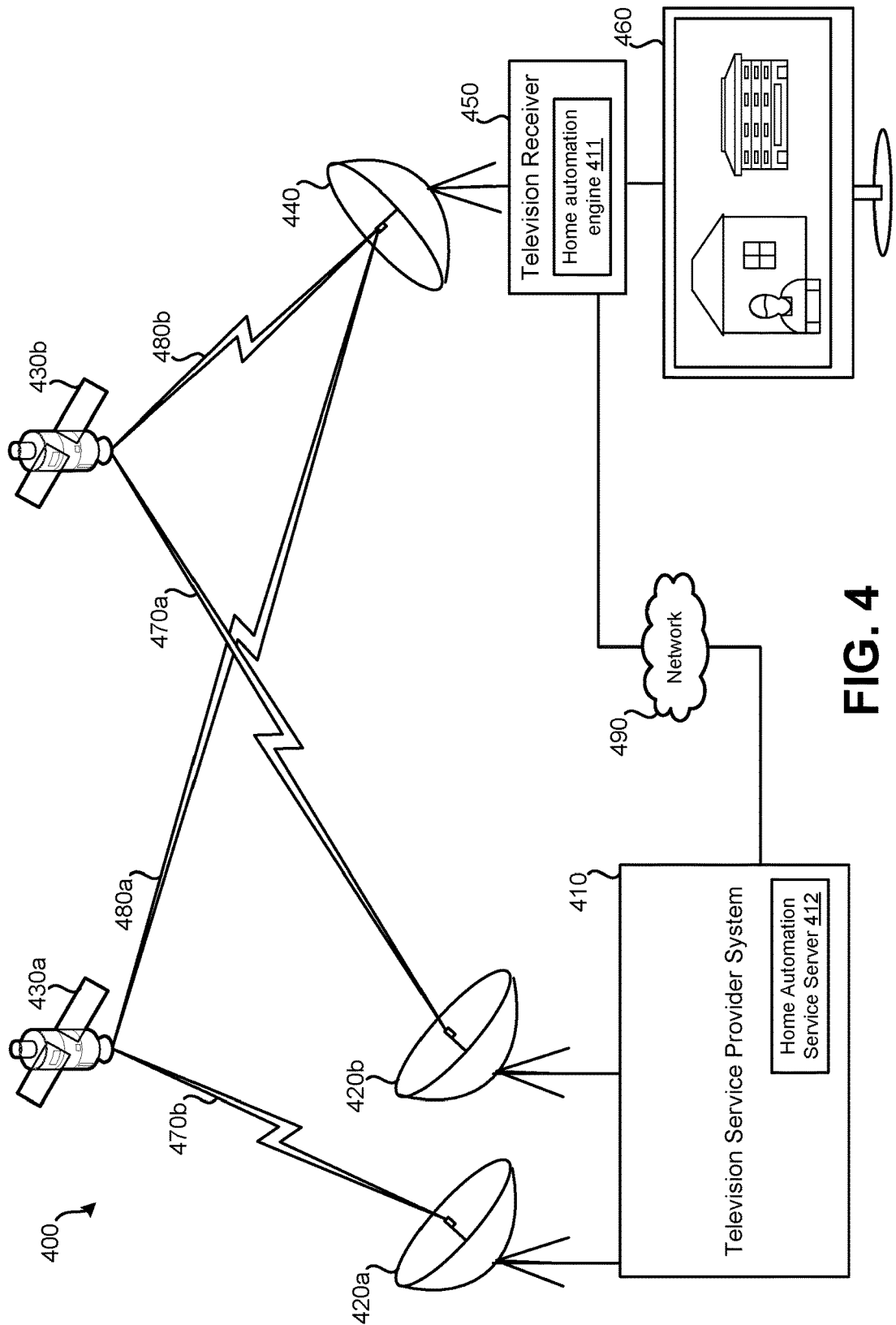
FIG. 4 illustrates an embodiment of a television service provider system that provides home automation functionality.

FIG. 4 illustrates an embodiment of a satellite television distribution system 400. While a home automation system may be incorporated with various types of television receivers, various embodiments may be part of a satellite-based television distribution system. Cable, IP-based, wireless, and broadcast focused systems are also possible. Satellite television distribution system 400 may include: television service provider system 410, satellite transmitter equipment 420, satellites 430, satellite dish 440, television receiver 450, home automation service server 412, and display device 460. The display device 460 can be controlled by, for example, a user using a remote control device that can send wired or wireless signals to communicate with the television receiver 450 and/or display device 460. Alternate embodiments of satellite television distribution system 400 may include fewer or greater numbers of components. While only one satellite dish 440, television receiver 450, and display device 460 (collectively referred to as "user equipment") are illustrated, it should be understood that multiple (e.g., tens, thousands, millions of) instances and types of user equipment may receive data and television signals from television service provider system 410 via satellites 430.

Television service provider system 410 and satellite transmitter equipment 420 may be operated by a television service provider. A television service provider may distribute television channels, on-demand programming, programming information, and/or other content/services to users. Television service provider may also distribute software updates for television receiver 450. Television service provider system 410 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 420 may be used to transmit a feed of one or more television channels from television service provider system 410 to one or more satellites 430. While a single television service provider system 410 and satellite transmitter equipment 420 are illustrated as part of satellite television distribution system 400, it should be understood that multiple instances of transmitter equipment may be used, possibly scattered geographically, to communicate with satellites 430. Such multiple instances of satellite transmitting equipment may communicate with the same or with different satellites. Different television channels may be transmitted to satellites 430 from different instances of transmitting equipment. For instance, a different satellite dish of satellite transmitter equipment 420 may be used for communication with satellites in different orbital slots.

Satellites 430 may be configured to receive signals, such as streams of television channels or other data including software images for updating various television receivers, from one or more satellite uplinks such as satellite transmitter equipment 420. Satellites 430 may relay received signals from satellite transmitter equipment 420 (and/or other satellite transmitter equipment) to multiple instances of user equipment via transponder streams. Different frequencies may be used for uplink signals 470 from downlink signals 480. Satellites 430 may be in geosynchronous orbit. Each of the transponder streams transmitted by satellites 430 may contain multiple television channels transmitted as packetized data. For example, a single transponder stream may be a serial digital packet stream containing multiple television channels. Therefore, packets for multiple television channels may be interspersed. Further, information used by television receiver 450 for home automation functions may also be relayed to a television receiver via one or more transponder streams. Further still, software images used to update television receiver 450 can be relayed to television receiver 450 via one or more transponder streams.

Multiple satellites 430 may be used to relay television channels or any other data such as information used for home automation or software images used to update television receiver 450 from television service provider system 410 to satellite dish 440. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 430a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 440 may be a piece of user equipment that is used to receive transponder streams from one or more satellites, such as satellites 430. Satellite dish 440 may be provided to a subscriber for use on a subscription basis to receive television channels provided by the television service provider system 410, satellite transmitter equipment 420, and/or satellites 430. Satellite dish 440, which may include one or more low noise blocks ("LNBs"), may be configured to receive transponder streams from multiple satellites and/or multiple transponders of the same satellite. Satellite dish 440 may be configured to receive television channels via transponder streams on multiple frequencies. Based on the characteristics of television receiver 450 and/or satellite dish 440, it may only be possible to capture transponder streams from a limited number of transponders concurrently. For example, a tuner of television receiver 450 may only be able to tune to a single transponder stream from a transponder of a single satellite at a given time. The tuner can then be re-tuned to another transponder of the same or a different satellite. A television receiver 450 having multiple tuners may allow for multiple transponder streams to be received at the same time.

In communication with satellite dish 440 may be one or more television receivers. Television receivers may be configured to decode signals received from satellites 430 via satellite dish 440 for output and presentation via a display device, such as display device 460. A television receiver may be incorporated as part of a television or may be part of a separate device, commonly referred to as a set-top box ("STB"). Television receiver 450 may decode signals received via satellite dish 440 and provide an output to display device 460. On-demand content, such as PPV content, may be stored to a computer-readable storage medium. FIG. 1 provides additional detail of various embodiments of a television receiver. A television receiver is defined to include STBs, and also circuitry having similar functionality that may be incorporated with another device. For instance, circuitry similar to that of a television receiver may be incorporated as part of a television. As such, while FIG. 4 illustrates an embodiment of television receiver 450 as separate from display device 460, it should be understood that, in other embodiments, similar functions may be performed by a television receiver integrated with display device 460. Television receiver 450 may include home automation engine 411.

Display device 460 may be used to present video and/or audio decoded and output by television receiver 450. Television receiver 450 may also output a display of one or more interfaces to display device 460, such as an electronic programming guide ("EPG"). In many embodiments, display device 460 is a television. Display device 460 may also be a monitor, computer, or some other device configured to display video and, possibly, play audio.

Uplink signal 470a represents a signal between satellite transmitter equipment 420 and satellite 430a. Uplink signal 470b represents a signal between satellite transmitter equipment 420 and satellite 430b. Each of uplink signals 470 may contain streams of one or more different television channels. For example, uplink signal 470a may contain a first group of television channels, while uplink signal 470b contains a second group of television channels. Each of these television channels may be scrambled such that unauthorized persons are prevented from accessing the television channels. Uplink signals 470 can also contain other data as described herein, such as software images for updating television receiver 450.

Downlink signal 480a represents a signal between satellite 430a and satellite dish 440. Downlink signal 480b represents a signal between satellite 430b and satellite dish 440. Each of downlink signals 480 may contain one or more different television channels, which may be at least partially scrambled. A downlink signal may be in the form of a transponder stream. A single transponder stream may be tuned to at a given time by a tuner of a television receiver. For example, downlink signal 480a may be a first transponder stream containing a first group of television channels, while downlink signal 480b may be a second transponder stream containing a different group of television channels. In addition to or instead of containing television channels, a transponder stream can be used to transmit on-demand content to television receivers, including PPV content, which may be stored locally by the television receiver until output for presentation. Further, a transponder stream can contain other data as described herein, such as software images for updating television receiver 450.

FIG. 4 illustrates downlink signal 480a and downlink signal 480b, being received by satellite dish 440 and distributed to television receiver 450. For a first group of television channels, satellite dish 440 may receive downlink signal 480a and for a second group of channels, downlink signal 480b may be received. Television receiver 450 may decode the received transponder streams. As such, depending on which television channels are desired to be presented or stored, various transponder streams from various satellites may be received, descrambled, and decoded by television receiver 450.

Network 490, which may include the Internet, may allow for bidirectional communication between television receiver 450 and television service provider system 410, such as for home automation related services provided by home automation service server 412. Although illustrated as part of the television service provider system, the home automation service server 412 may be provided by a third party in embodiments. In addition or in alternate to network 490, a telephone, e.g., landline, or cellular connection may be used to enable communication between television receiver 450 and television service provider system 410.

FIG. 5 illustrates an embodiment of a computer system 500. A computer system 500 as illustrated in FIG. 5 may be incorporated into devices such as a television receiver, DVR, television, media system, personal computer, and the like. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include without limitation a mouse, a keyboard, a camera, a remote control, and/or the like; and one or more output devices 520, which can include without limitation a display device, a printer, and/or the like.

The computer system 500 may further include and/or be in communication with one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, may be incorporated into the computer system 500 (e.g., an electronic device or STB), as an input device 515. In many embodiments, the computer system 500 will further comprise a working memory 535, which can include a RAM or ROM device, as described above.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 3, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received from the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system for predictive pre-buffering, the system comprising:
   one or more processors; and
   a memory comprising instructions that, when executed by the one or more processors, cause the one or more processors to:
   receive a plurality of trending program names from at least one social media source, each trending program name corresponding to one of a plurality of trending programs, and each of the plurality of trending programs having an associated popularity score;
   receive personal viewing history of a user, the personal viewing history comprising a plurality of viewed program names, the viewed program names generated based on programs previously viewed by the user;
   identify a plurality of preferred programs as each corresponding to one of the trending programs calculated to have a combined score above a threshold value, the combined score calculated for each trending program as a function of the associated popularity score and a similarity of the trending program to viewed programs indicated by the viewed program names in the personal viewing history of a user; and
   buffer a portion of each of the preferred programs in a cache of a device of the user by allocating, to each of the preferred programs, a respective portion of the buffer that is sized in accordance with the combined score of the trending program corresponding to the preferred program.

2. The system for predictive pre-buffering of claim 1, wherein the instructions comprise further instructions that, when executed by the one or more processors, cause the one or more processors to:
   identify a plurality of genres;
   categorize each trending program name in the plurality of trending program names based on a genre of the plurality of genres;
   wherein the instructions that cause the one or more processors to identify the one or more preferred programs comprise further instructions that, when executed by the one or more processors, cause the one or more processors to:
   identify a preferred genre from the plurality of genres based on the personal viewing history;
   identify a first trending program name from the plurality of trending program names categorized as the preferred genre; and
   designate the first trending program name as a preferred program.

3. The system for predictive pre-buffering of claim 2, wherein the instructions that cause the processor to identify the preferred genre comprise further instructions that, when executed by the one or more processors, cause the one or more processors to:
   categorize each viewed program name in the plurality of viewed program names based on a genre of the plurality of genres;
   calculate a genre score for each genre in the plurality of genres based on a number of viewed program names categorized in that genre; and
   select each genre of the plurality of genres having a genre score over a threshold value.

4. The system for predictive pre-buffering of claim 1, wherein the instructions comprise further instructions that, when executed by the one or more processors, cause the one or more processors to:
   obtain a current network load value; and
   wherein the instructions to buffer the portion of the one or more preferred programs comprise instructions that, when executed by the one or more processors, cause the one or more processors to:
   compare the current network load value to a network load threshold, the compare comprising:
   when the current network load value is below the network load threshold, buffer the portion of the one or more preferred programs in the cache of the device of the user; and when the current network load value is above the network load threshold, perform the compare the current network load value to the network load threshold operation after a predefined period of time.

5. The system for predictive pre-buffering of claim 1, wherein the instructions comprise further instructions that, when executed by the one or more processors, cause the one or more processors to:
  obtain a device status value; and
  wherein the instructions to buffer the portion of the one or more preferred programs comprise instructions that, when executed by the one or more processors, cause the one or more processors to:
    when the device status value indicates the device is available, buffer the portion of the one or more preferred programs in the cache of the device of the user; and
    when the device status value indicates the device is busy, perform the obtain the device status value operation after a predefined period of time.

6. The system for predictive pre-buffering of claim 1, wherein the combined score is calculated for each trending program in accordance with further instructions that, when executed by the one or more processors, cause the one or more processors to, for each trending program:
  receive the popularity score of the trending program from the at least one social media source;
  calculate a personal viewing history score for the trending program based on the similarity of the trending program to the viewed programs;
  apply a first weight to the popularity score based on past user selections of any of the one or more preferred programs to generate a weighted popularity score;
  apply a second weight to the personal viewing history score based on the past user selections of any of the one or more preferred programs to generate a weighted personal viewing history score; and
  combine the weighted popularity score and the weighted personal viewing history score to generate the combined score.

7. The system for predictive pre-buffering of claim 1, wherein the instructions to buffer comprise further instructions that, when executed by the one or more processors, cause the one or more processors to:
  rank the one or more preferred programs based on the combined score for each of the one or more preferred programs,
  wherein, for each of the preferred programs, the respective portion of the buffer that is sized in accordance with the rank.

8. The system for predictive pre-buffering of claim 7, wherein the instructions comprise further instructions that, when executed by the one or more processors, cause the one or more processors to:
  provide each of the one or more preferred programs having a combined score above a second threshold value as a suggestion to the user.

9. The system for predictive pre-buffering of claim 1, wherein the instructions comprise further instructions that, when executed by the one or more processors, cause the one or more processors to:
  in response to receiving a user selection to save space, limit a number of the one or more preferred programs or limit a size of the portion of each of the one or more preferred programs.

10. The system for predictive pre-buffering of claim 1, wherein the instructions comprise further instructions that, when executed by the one or more processors, cause the one or more processors to:
  in response to receiving a user selection to save time, expand a number of the one or more preferred programs or expand a size of the portion of each of the one or more preferred programs.

11. A non-transitory, computer readable memory device having stored thereon instructions for predictive pre-buffering that, when executed by one or more processors, cause the one or more processors to:
  receive a plurality of trending program names from at least one social media source, each trending program name corresponding to one of a plurality of trending programs, and each of the plurality of trending programs having an associated popularity score;
  receive personal viewing history of a user, the personal viewing history comprising a plurality of viewed program names, the viewed program names generated based on programs previously viewed by the user;
  identify a plurality of preferred programs as each corresponding to one of the trending programs calculated to have a combined score above a threshold value, the combined score calculated for each trending program as a function of the associated popularity score and a similarity of the trending program to viewed programs indicated by the viewed program names in the personal viewing history of a user; and
  buffer a portion of each of the preferred programs in a cache of a device of the user by allocating, to each of the preferred programs, a respective portion of the buffer that is sized in accordance with the combined score of the trending program corresponding to the preferred program.

12. The non-transitory, computer readable memory device of claim 11, wherein the instructions comprise further instructions that, when executed by the one or more processors, cause the one or more processors to:
  identify a plurality of genres;
  categorize each trending program name in the plurality of trending program names based on a genre of the plurality of genres;
  wherein the instructions that cause the one or more processors to identify the one or more preferred programs comprise further instructions that, when executed by the one or more processors, cause the one or more processors to:
  identify a preferred genre from the plurality of genres based on the personal viewing history;
  identify a first trending program name from the plurality of trending program names categorized as the preferred genre; and
  designate the first trending program name as a preferred program.

13. The non-transitory, computer readable memory device of claim 12, wherein the instructions that cause the processor to identify the preferred genre comprise further instructions that, when executed by the one or more processors, cause the one or more processors to:
  categorize each viewed program name in the plurality of viewed program names based on a genre of the plurality of genres;
  calculate a genre score for each genre in the plurality of genres based on a number of viewed program names categorized in that genre; and select each genre of the plurality of genres having a genre score over a threshold value.

14. The non-transitory, computer readable memory device of claim 11, wherein the instructions comprise further instructions that, when executed by the one or more processors, cause the one or more processors to:
obtain a current network load value;
obtain a device status value; and
wherein the instructions to buffer the portion of the one or more preferred programs comprise instructions that, when executed by the one or more processors, cause the one or more processors to:
compare the current network load value to a network load threshold, the compare comprising:
when the current network load value is below the network load threshold and when the device status value indicates the device is available, buffer the portion of the one or more preferred programs in the cache of the device of the user; and
when the current network load value is above the network load threshold or when the device status value indicates the device is busy, perform the compare the current network load value to the network load threshold operation and the obtain the device status value operation after a predefined period of time.

15. The non-transitory, computer readable memory device of claim 11, wherein the instructions comprise further instructions that, when executed by the one or more processors, cause the one or more processors to:
receive a popularity score of the trending program from the at least one social media source;
calculate a personal viewing history score for the trending program based on the similarity of the trending program to the viewed programs;
apply a first weight to the popularity score based on past user selections of any of the one or more preferred programs to generate a weighted popularity score;
apply a second weight to the personal viewing history score based on the past user selections of any of the one or more preferred programs to generate a weighted personal viewing history score; and
combine the weighted popularity score and the weighted personal viewing history score to generate the combined score.

16. The non-transitory, computer readable memory device of claim 11, wherein the instructions comprise further instructions that, when executed by the one or more processors, cause the one or more processors to:
rank the preferred programs based on the combined score for each of the preferred programs; and
for each of the preferred programs, determine the size of the portion to buffer based on the rank of the preferred program.

17. A method for predictive pre-buffering, the method comprising:
receiving a plurality of trending program names from at least one social media source, each trending program name corresponding to one of a plurality of trending programs, and each of the plurality of trending programs having an associated popularity score;
receiving personal viewing history of a user, the personal viewing history comprising a plurality of viewed program names, the viewed program names generated based on programs previously viewed by the user;
identifying a plurality of preferred programs as each corresponding to one of the trending programs calculated to have a combined score above a threshold value, the combined score calculated for each trending program as a function of the associated popularity score and a similarity of the trending program to viewed programs indicated by the viewed program names in the personal viewing history of a user; and
buffering a portion of each of the preferred programs in a cache of a device of the user by allocating, to each of the preferred programs, a respective portion of the buffer that is sized in accordance with the combined score of the trending program corresponding to the preferred program.

18. The method for predictive pre-buffering of claim 17, the method further comprising:
identifying a plurality of genres;
categorizing each trending program name in the plurality of trending program names based on a genre of the plurality of genres;
wherein the identifying the one or more preferred programs comprises:
identifying a preferred genre from the plurality of genres based on the personal viewing history;
identifying a first trending program name from the plurality of trending program names categorized as the preferred genre; and
designating the first trending program name as a preferred program.

19. The method for predictive pre-buffering of claim 17, the method further comprising:
obtaining a current network load value;
obtaining a device status value; and
wherein buffering the portion of the one or more preferred programs comprises:
comparing the current network load value to a network load threshold, wherein the comparing comprises:
when the current network load value is below the network load threshold and when the device status value indicates the device is available, buffering the portion of the one or more preferred programs in the cache of the device of the user; and
when the current network load value is above the network load threshold or when the device status value indicates the device is busy, performing the compare the current network load value to the network load threshold operation and the obtaining the device status value operation after a predefined period of time.

* * * * *